United States Patent
Regnier et al.

(10) Patent No.: US 10,526,494 B2
(45) Date of Patent: Jan. 7, 2020

(54) INK RECEPTIVE PRIMER COATINGS WITH IMPROVED WATER AND CHEMICAL RESISTANCE CHARACTERISTICS

(71) Applicant: Michelman, Inc., Cincinnati, OH (US)

(72) Inventors: Baptiste Regnier, Thionville (FR); Jeffrey Bowles, Bethel, OH (US); Kaitlyn Slack, Bethel, OH (US)

(73) Assignee: Michelman, Inc., Cincinnati, OH (US)

( * ) Notice: Subject to any disclaimer, the term of this patent is extended or adjusted under 35 U.S.C. 154(b) by 235 days.

(21) Appl. No.: 15/727,037

(22) Filed: Oct. 6, 2017

(65) Prior Publication Data

US 2018/0100070 A1 Apr. 12, 2018

Related U.S. Application Data

(60) Provisional application No. 62/405,596, filed on Oct. 7, 2016.

(51) Int. Cl.
| | |
|---|---|
| *C09D 5/00* | (2006.01) |
| *C08F 2/48* | (2006.01) |
| *C09D 5/02* | (2006.01) |
| *C09D 11/102* | (2014.01) |
| *C09D 11/106* | (2014.01) |
| *C09D 109/06* | (2006.01) |
| *C08F 212/08* | (2006.01) |
| *C08F 236/06* | (2006.01) |

(52) U.S. Cl.
CPC .............. *C09D 5/002* (2013.01); *C09D 5/00* (2013.01); *C09D 5/027* (2013.01); *C09D 11/102* (2013.01); *C09D 11/106* (2013.01); *C09D 109/06* (2013.01); *C08F 2/48* (2013.01); *C08F 212/08* (2013.01); *C08F 236/06* (2013.01)

(58) Field of Classification Search
None
See application file for complete search history.

(56) References Cited

U.S. PATENT DOCUMENTS

| | | | |
|---|---|---|---|
| 7,470,736 B2 | 12/2008 | Cooper | |
| 2004/0063023 A1* | 4/2004 | Rao | ........................... B41M 5/44 430/201 |

FOREIGN PATENT DOCUMENTS

| | | |
|---|---|---|
| EP | 0254523 A2 | 1/1988 |
| EP | 1403701 A2 | 3/2004 |
| EP | 2623575 A1 | 8/2013 |
| WO | 2001081485 A1 | 11/2001 |

OTHER PUBLICATIONS

International Search Report and Written Opinion dated Jan. 4, 2018, pertaining to International Patent Application No. PCT/US2017/055580.

* cited by examiner

*Primary Examiner* — Sheeba Ahmed
(74) *Attorney, Agent, or Firm* — Vorys, Sater, Seymour and Pease LLP

(57) ABSTRACT

Embodiments of the present disclosure are directed to primer coatings, polymeric substrates, and methods of producing thereof, which provide enhanced adhesion and enhanced chemical and water resistance properties. The primer coatings comprise functionalized styrene-butadiene and ink adhesion promoter.

20 Claims, No Drawings

INK RECEPTIVE PRIMER COATINGS WITH IMPROVED WATER AND CHEMICAL RESISTANCE CHARACTERISTICS

CROSS-REFERENCE TO RELATED APPLICATION

This application claims priority to U.S. Provisional Application No. 62/405,596 filed Oct. 7, 2016, entitled "Ink Receptive Primer Coatings With Improved Water and Chemical Resistance Characteristics," the entirety of which is incorporated by reference herein.

TECHNICAL FIELD

Embodiments of the present disclosure generally relate to ink receptive primer coatings which provide improved water and chemical resistance performance for coated polymeric film substrates. Specifically, embodiments of the present disclosure generally relate to primer coatings comprising styrene-butadiene, ink adhesion promoters, and coated polymeric substrates including these primer coatings.

BACKGROUND

Polymeric films such as biaxially oriented polypropylene (BOPP), biaxially oriented polyethylene terephthalate (BO-PET), or polyester films have been widely used in variety of applications, for example, in print labels, cartons, labels, shrink sleeves, or flexible packaging materials for food, liquids, and toiletries. Such films are also often printed with the use of high-speed digital printing machines utilizing liquid or dry toners or inks in electrophotographic systems. In such systems, toner images are formed on a photosensitive drum and then electrically transferred onto an intermediate transfer blanket or belt for printing onto a polymeric film sheet or web. Printers using such toners or inks are commercially available from Hewlett-Packard Company under the trade name HP Indigo. However, as liquid toners do not always transfer well and/or adhere well to polymeric film substrates which are printed using such presses, the substrates are typically coated with a primer to enhance the adhesion of liquid toners thereto.

A number of primers have been developed for use on polymeric film substrates which render the surface of the films more receptive to toners and inks. Typical primers currently in use have been developed based on ethylene-acrylic acid copolymers. One such primer is described in commonly-assigned U.S. Pat. No. 7,470,736.

However, the development of newer, high speed digital presses has presented new challenges to the use of primers with regard to liquid toner and/or ink transfer and adhesion to the polymer substrates. For example, the more recently developed HP Indigo 6000 series of digital presses offer digital printing at about twice the speed of previous Indigo presses. In addition, the HP 20000 digital press is capable of printing a 30-inch (76.2 cm) wide film and the HP 30000 digital press is capable of printing at a 29.5 inch (75.0 cm) width on a variety of substrate types.

Due to the specifications of the liquid toners used in such presses, conventional primers do not provide sufficient toner adhesion to the underlying polymeric substrate. As a result, substrates coated with conventional primers may experience undesirable toner transfer to and adhesion to the substrate. Accordingly, there is a continual need for a primer which provides good toner and/or ink adhesion to polymeric substrates.

Additionally, ink adhesion for conventional primers and coated substrates may be impacted when the primer and/or the coated substrate is exposed to water or other chemicals. Consequently, there is also a need for primers which are resistant to damage from water and/or chemicals and thereby also maintain the desired ink adhesion.

SUMMARY

Embodiments of the invention relate to primer coatings, specifically, for primer coatings applied to a polymeric substrate, which is subsequently printed with a liquid ink or toner. Embodiments of the present disclosure achieve the desired resistance and ink adhesion by providing a primer coating comprising styrene-butadiene and ink adhesion promoter.

According to one embodiment of the present disclosure, a primer coating is provided, which comprises an aqueous dispersion, the aqueous dispersion comprising 1 to 25 weight % functionalized styrene-butadiene based on total solids in the aqueous dispersion, and 1 to 25 weight % ink adhesion promoter based on total solids in the aqueous dispersion.

In another embodiment of the present disclosure, a coated polymeric substrate is provided, which includes: a polymer film substrate, a primer coating disposed on at least one surface of the polymer film substrate, wherein the primer coating comprises 20 to 80 weight % functionalized styrene-butadiene, and 20 to 80 weight % ink adhesion promoter on a dry weight basis; and optionally also includes an over print varnish layer.

Additional features and advantages of the described embodiments will be set forth in the detailed description which follows, and in part will be readily apparent to those skilled in the art from that description or recognized by practicing the described embodiments, including the detailed description which follows and the claims.

DETAILED DESCRIPTION

Embodiments of the present disclosure are directed to primer coatings which may be applied to polymeric substrates to provide enhanced ink and/or toner adhesion, especially for use in HP Indigo printing, as well as resistance to water and/or other chemicals.

The following description of the embodiments is illustrative in nature and in no way intended to be limiting it its application or use. Unless otherwise indicated, the disclosure of any ranges in the specification and claims are to be understood as including the range itself and also values subsumed therein, as well as endpoints.

One embodiment of the present disclosure includes, among other things, a primer coating comprising functionalized styrene-butadiene and ink adhesion promoter. As will be described in further detail below, the primer coating may be applied as an aqueous dispersion comprising functionalized styrene-butadiene and ink adhesion promoter and water (e.g., deionized water).

Functionalized Styrene-Butadiene

The functionalized styrene-butadiene increases the chemical and water resistance of the primer coating and is compatible the ink adhesion promoter of the primer coating. As used herein, "functionalized" means water dispersible moieties grafted or covalently bonded to the styrene-butadiene molecule. Without being bound by theory, these functionalized groups may provide various benefits for the primer coating. For example, these functional groups may provide greater compatibility with the ink adhesion promoter. Moreover, these functional groups may interact with Brønsted acid functional groups of molecules of the ink to enhance ink adhesion.

Suitable functional groups may include carboxylated acids such as having carboxylic acid groups (—COOH), acrylic acid groups (—CH2=CH—COOH), methacrylic acid groups (—CH$_2$=C(CH$_3$)—COOH) and sulfonates such as having sulfonic acid groups (—SO$_3$H). Additionally, further groups may also include amino groups, thereby producing an amino functionalized styrene-butadiene. Suitable commercial examples of the functionalized styrene-butadiene include Rovene® 5499, a carboxylated styrene-butadiene aqueous dispersion supplied by Mallard Creek Polymers and Styronal® D517, a styrene-butadiene aqueous dispersion available from BASF.

Various amounts are contemplated for the functionalized styrene-butadiene. In some embodiments of the present disclosure, when in aqueous solution, the primer coating may comprise from 1 to 25% functionalized styrene-butadiene, 1 to 20% functionalized styrene-butadiene, or in further embodiments, from 1 to 15 weight % functionalized styrene-butadiene, or from 1 to 10 weight % functionalized styrene-butadiene, or from 1 to 8 weight % functionalized styrene-butadiene, or from 1 to 3 weight % functionalized styrene-butadiene based on total solids in the aqueous primer coating.

The amount of solids in the aqueous primer coating may vary depending on the particular embodiment. In one particular example, the aqueous primer coating may be from about 4 to about 8 weight % solids based on a total weight of the aqueous primer coating, although it is contemplated that more concentrated and more diluted coatings may be employed.

Similarly, various amounts are contemplated for the functionalized styrene-butadiene after the primer coating has been applied on the polymer film substrate and dried. In one or more embodiments, the primer coating comprises from 20 to 80 weight % functionalized styrene-butadiene, or from 30 to 70 weight % functionalized styrene-butadiene, or from 40 to 60 weight % functionalized styrene-butadiene based on dry weight of the primer coating.

Ink Adhesion Promoter

As stated above, the primer also comprises an ink adhesion promoter which helps achieve good adhesion of toner and/or ink images to the polymeric substrate; however, without the functionalized styrene-butadiene, the desired chemical and water resistance cannot be achieved. Thus, the combination of ink adhesion and functionalized styrene-butadiene synergistically achieves chemical and water resistance while maintaining the requisite ink adhesion.

Various ink adhesion promoters are considered suitable. For example, the ink adhesion promoter comprises one or more of polyethyleneimine, polyvinylpyrrolidone (PVP), polyurethane, or polyacrylamides. In a specific embodiment, the ink adhesion promoter comprises polyethyleneimine. In some embodiments, other components of capable of crosslinking amino-functional polymers for purposes of increasing water resistance may be included. For example, the aqueous dispersion may include aldehydes and/or epoxies.

One suitable commercial embodiment of a polyethyleneimine is Lupasol P from BASF. Other suitable commercial embodiments of polyethyleneimine include Polymin P, available from BASF, Epomin, available from Nippon Shokubai, TITA Bond T100, available from Nippon Soda Co., and D1 Dry AC-108, available from DIC Graphics. In yet another embodiment, a suitable ink adhesion promoter may be DigiPrime® 050 supplied by Michelman.

In further embodiments, the ink adhesion promoter may be in a modified form. For example, the ink adhesion promoter may comprise a crosslinked ink adhesion promoter, for example a crosslinked polyethyleneimine. In some embodiments of the present disclosure, the crosslinker may comprise an aldehyde, dialdehyde, organic salt, inorganic salt, or a combination thereof. In other embodiments, the crosslinker may comprise urea formaldehyde, glyoxal, glutaraldehyde, zirconium oxide, zinc oxide, titanium lactate, or any other crosslinking agents that interconnect and crosslink the ink adhesion promoter.

Various amounts are contemplated for the ink adhesion promoter. In some embodiments of the present disclosure, when in aqueous solution, the primer coating may comprise from 1 to 25% ink adhesion promoter, 2 to 20% ink adhesion promoter, or in further embodiments, from 3 to 15 weight % ink adhesion promoter, or from 3 to 12 weight % ink adhesion promoter, or from 3 to 10 weight % ink adhesion promoter, or from 3 to 8 weight % ink adhesion promoter based on total solids in the aqueous primer coating.

Similarly, various amounts are contemplated for the ink adhesion promoter after the primer coating has been applied on the polymer film substrate and dried. In one or more embodiments, the primer coating comprises from 20 to 80 weight % ink adhesion promoter, or from 30 to 70 weight % ink adhesion promoter, or from 40 to 60 weight % ink adhesion promoter based on the dry weight of the primer coating.

In additional embodiments, whether in the aqueous dispersion or after the primer coating is dried, the ratio by weight of functionalized styrene-butadiene to ink adhesion promoter may be from 1:3 to 3:1, or from 1:2 to 2:1, or from 4:3 to 3:4. In one embodiment, the ratio by weight of functionalized styrene-butadiene to ink adhesion promoter may be 2:3. In one or more embodiment, the aqueous primer formulation may include 5 to 20 wt. % solids, or 5 to 15 wt. % solids, or 10 to 20 wt. % solids, or 10 to 15 wt. % solids total.

In some embodiments, the primer coating, whether in aqueous dispersion or dried form, may comprise only functionalized styrene-butadiene and ink adhesion promoter. In other words, the primer coating may "consist of" or "consist essentially of" functionalized styrene-butadiene and ink adhesion promoter. However, it is contemplated in other embodiments to include other components such as wetting agents, surfactants, anti-foaming additives, catalysts, solvents or other processing aids. As the primer is water resistant, the primer coating, whether in aqueous dispersion or dried form, may be substantially free of hydrophilic materials, for example, hydrophilic colloids such as gelatin.

Coated Substrate

As stated above, the primer coating is used to coat a polymer film substrate by application on at least one surface of the polymer film substrate. As stated in the embodiments above, the dried primer coating may comprise 20 to 80 weight % functionalized styrene-butadiene, and 20 to 80 weight % ink adhesion promoter.

Embodiments of the polymer film substrate may comprise polyesters, polyolefins, or combinations thereof. For example, and not by way of limitation, the polymer film substrate may be selected from polylactic acid (PLA), polyethylene terephthalate (PET), biaxially oriented polyethylene terephthalate (BOPET), oriented polypropylene (OPP), biaxially oriented polypropylene (BOPP), biaxially oriented polyamide (BOPA), or combinations thereof.

As used herein, the polymeric film substrate may encompass packaging, labels, such as pressure sensitive labels, glue applied labels, or the like. In a specific embodiment, the film substrates are labels. Varying dimensions of the labels are contemplated. For example, the labels may have a thickness of 1.2 to 2.0 mils, wherein 2 mils is approximately 50 μm.

In further embodiments, the coated polymer film substrate may further comprise an over print varnish (OPV) layer disposed over the primer coating and the toner and/or ink printed thereon. The OPV layer may protect the printed film and also may enhance the appearance of the printed film. Without being bound by theory, the OPV layer may enhance the chemical resistance of the printed film. The OPV layer may comprise UV curable oligomers. In one embodiment, the over print varnish layer may comprise acrylates. Various commercial OPV coating layers are considered suitable. For example, the OPV layer may be ACTDigi® UV OPV RDS000617 supplied by ACTEGA Coatings & Sealants. Alternative commercial OPV coatings may include the DigiGuard® OPV coatings from Michelman, Inc.

As stated throughout, the primer coating is directed to improve ink or toner adhesion for the coated polymeric substrate. In one or more embodiments, the toner and/or ink may be printed or applied over the primer composition. Optionally, the OPV layer may be applied over the primer and printed toner and/or ink.

Various methodologies are contemplated for making the coated polymeric film substrate. In one embodiment, the method comprises applying a primer coating onto at least one surface of a polymeric substrate, the primer coating comprising an aqueous solution of functionalized styrene-butadiene, and ink adhesion promoter. The primer coating may, in some embodiments, be applied to one or both sides of the substrate. The coating may be applied by gravure coating, rod coating, or flexographic printing at ambient temperature to polymeric substrates. Before the primer is applied, the surface of the substrate may be treated to ensure that the primer will wet out the surface of the film. Specifically, the film may be treated using conventional techniques such as a flame, plasma, or corona discharge treatment.

After applying the primer coating, the primer coating is then dried. While various drying methods are contemplated, in one embodiment, the primed film may be dried in the inline priming unit of the HP Indigo press at temperatures ranging from about 60 to about 80° C. Other drying methods would be familiar to the skilled person. After the primer coating is dried, a toner or ink image may be applied over the primer coating, optionally followed by the OPV coating.

The primer coating improves ink or toner adhesion for a variety of printing methods and equipment, but especially improves ink or toner adhesion to polymeric substrates which are printed using high speed digital presses such as the HP Indigo WS 6000 series of digital presses or the HP 20000 or 30000 wide format digital presses. For example, the primer coating used on the polymeric substrates comprising the laminate structure may be applied to substrates which are printed using liquid toners and/or inks suitable for HP Indigo WS6600 or WS6000, 20000 or 30000 Digital Presses. These presses are designed to print substrates used for flexible packaging. Such digital presses also include an optional in-line priming unit which applies primer to uncoated substrates in-line (following a corona treatment) and dries the primer just prior to printing. Thus, the presses are capable of priming and printing substrates in a single pass.

EXAMPLES

In order that the embodiments may be more easily understood, reference is made to the following examples which are intended to illustrate embodiments disclosed and described herein. The examples are in no ways limiting in scope.

Coated labels were produced from the commercial products listed in Table 1.

TABLE 1

| Product | Composition | Supplier |
| --- | --- | --- |
| Rovene ® 5499 | Carboxylated styrene-butadiene latex | Mallard Creek Polymers |
| DigiPrime ® 050 | Ink Adhesion Promoter | Michelman, Inc. |
| ACTDigi ® UV OPV RDS000617 | Over Print Varnish | ACTEGA Coatings & Sealants |
| Optiflex CPP20413 PP 200H Clear TC-458 V-01 TRACrite 120 BOPP Label Stock | Clear Polypropylene (PP) Label Stock | Flexcon |

Referring to Table 2 below, the primer coatings of Samples 1 and 2 included Rovene® 5499 (carboxylated styrene-butadiene) and DigiPrime® 050 (ink adhesion promoter), whereas Comparative Samples 1 and 2 included only DigiPrime® 050 (ink adhesion promoter) and Comparative Samples 3 and 4 included only Rovene® 5499 (carboxylated styrene-butadiene). The formulation of Samples 1 and 2 were prepared by diluting carboxylated styrene-butadiene and ink adhesion promoter solutions to 5% solids each, then adding the ink adhesion promoter to the carboxylated styrene-butadiene slowly with good mixing until a 4:3 ratio of ink adhesion promoter:carboxylated styrene-butadiene ratio is achieved in sufficient quantities. The labels were corona treated at an 800 watt (W) power output and then primed on an HP Indigo 6000 Press. Within the HP Press, the primed labels were dried. Then, the dried primed labels were subsequently printed with an HP color block source, i.e., a print file containing ink blocks with ink coverages varying from 100-400% for each color.

The Comparative samples 1-4 were similarly produced on the HP Indigo 6000 Press using the same priming, corona treatment, and printing process.

TABLE 2

|  | Sample 1 (S1) | Sample 2 (S2) | Comparative Sample 1 (C1) | Comparative Sample 2 (C2) | Comparative Sample 3 (C3) | Comparative Sample 4 (C4) |
| --- | --- | --- | --- | --- | --- | --- |
| Substrate | Clear PP Label Stock | Clear PP Label Stock | Clear PP Label Stock | Clear PP Label Stock | Clear PP Label Stock | Clear PP Label Stock |
| Primer | DigiPrime ® 050 and Rovene ® | DigiPrime ® 050 and Rovene ® | DigiPrime ® 050 | DigiPrime ® 050 | Rovene ® 5499 (5% by wt Total | Rovene ® 5499 (10% by wt Total |

TABLE 2-continued

|  | Sample 1 (S1) | Sample 2 (S2) | Comparative Sample 1 (C1) | Comparative Sample 2 (C2) | Comparative Sample 3 (C3) | Comparative Sample 4 (C4) |
| --- | --- | --- | --- | --- | --- | --- |
|  | 5499 in 4:3 ratio | 5499 in 4:3 ratio |  |  | Solids) | Solids) |
| Over Print Varnish | No OPV | ACTDigi® UV OPV RDS000617 | No OPV | ACTDigi® UV OPV RDS000617 | No OPV | No OPV |

Referring to Table 3 below, the results of the coated label after undergoing an Initial Tape Test and a Water Resistance Test are provided. For the Initial Tape test, the labels were pulled directly from the HP Indigo 6000 Press. The tape applied was a Scotch® 810 tape with a 2 kg roller to place the tape. After the tape is applied and air bubbles are reduced or eliminated, the tape is pulled from the surface, and the ink adhesion on the label surface is observed and calculated by eye. Then, a second tape test was performed after 15 minutes.

Further as shown in Table 3, the coated labels were immersed in water at room temperature for the time periods listed in Table 3, and then wiped off to remove excess water. At which point, the same tape test was conducted again to determine ink adhesion on the coated label.

TABLE 3

| Time | S1 (L) | S1 (H) | C1 (L) | C1 (H) | C3 (L) | C3 (H) | C4 (L) | C4 (H) |
| --- | --- | --- | --- | --- | --- | --- | --- | --- |
| Initial Tape Test |  |  |  |  |  |  |  |  |
| 0 min | 89% | 82% | 100% | 100% | 5% | 0% | 4% | 3% |
| 15 mins | 91% | 86% | 99% | 99% | 12% | 5% | 6% | 5% |
| Water resistance |  |  |  |  |  |  |  |  |
| 30 mins | — | — | 80% | 25% | — | — | — | — |
| 1 h | 82% | 71% | — | — | — | — | — | — |
| 2 h | — | — | 82% | 23% | — | — | — | — |
| 3 h | 86% | 75% | — | — | — | — | — | — |
| 24 h | 90% | 82% | 10% | 10% | — | — | — | — |

*(L) refers to low coverage
*(H) refers to high coverage

As used herein, "low coverage" means primer coating application of 100 to 200% coverage.

As used herein, "high coverage" means primer coating application of 300 to 400% coverage.

According to industry standard, the minimum acceptable ink adhesion is 70%. As shown in Table 3, Sample 1 achieves similar ink adhesion performance as Comparative Sample 1 under the Initial Tape Tests and Water Resistance Tests, although Sample 1 includes much less ink adhesion promoter. Moreover, Sample 1 surprisingly demonstrates over 90% ink adhesion after immersion in water for 24 hours, whereas Comparative Sample 1 achieves only 10% ink adhesion after immersion in water for 24 hours. For Comparative Samples 3 and 4, which does not include any ink adhesion promoter, ink adhesion is poor.

Similar to the Water Resistance Test, Table 4 shows the Chemical Resistance results collected after the coated labels were immersed in various solvents for an appropriate amount of time. After immersion, the samples were removed and patted dry, at which point the tape test was conducted. One difference is that Sample 2 and Comparative Sample 2 were coated with the OPV layer listed in Table 1.

TABLE 4

| Time | S2 (L) | S2 (H) | C2 (L) | C2 (H) |
| --- | --- | --- | --- | --- |
| Isopropyl Alcohol (IPA) |  |  |  |  |
| 30 minutes | 98% | 98% | 65% | 69% |
| 2 hours | 98% | 96% | 99% | 97% |
| Methyl Ethyl Ketone (MEK) |  |  |  |  |
| 30 minutes | 96% | 87% | 10% | 0% |
| 2 hours | 90% | 82% | 0% | 0% |
| Acetone |  |  |  |  |
| 30 minutes | 80% | 60% | 0% | 0% |
| 2 hours | 22% | 5% | 0% | 0% |

*(L) refers to low coverage
*(H) refers to high coverage

As shown in Table 4, Comparative Sample 2 fails the initial tape test (70% minimum) for IPA and fails for MEK and acetone at each time juncture. In contrast, Sample 1 withstands submersion in MEK, IPA, and acetone for at least 30 mins, thus demonstrating a marked improvement resulting from the inclusion of carboxylated styrene-butadiene in the primer layer. The IPA was a commercially available 91% by volume IPA purchased at Target Corp. The MEK and Acetone were both Klean-Strip® brand products that are commercially available at various hardware stores.

It should be apparent to those skilled in the art that various modifications and variations can be made to the described embodiments without departing from the spirit and scope of the claimed subject matter. Thus, it is intended that the specification cover the modifications and variations of the various described embodiments provided such modification and variations come within the scope of the appended claims and their equivalents.

What is claimed is:

1. A primer formulation comprising an aqueous dispersion, the aqueous dispersion comprising:
   1 to 25 weight % functionalized styrene-butadiene based on total solids in the aqueous dispersion; and
   1 to 25 weight % ink adhesion promoter based on total solids in the aqueous dispersion;
   wherein the aqueous dispersion is substantially free of hydrophilic colloids.

2. The primer formulation of claim 1 wherein the aqueous dispersion comprises 4 to 10 weight % functionalized styrene-butadiene.

3. The primer formulation of claim 1, wherein the aqueous dispersion comprises 4 to 10 weight % ink adhesion promoter based on total solids in the aqueous dispersion.

4. The primer formulation of claim 1, wherein the aqueous dispersion comprises a ratio by weight of functionalized styrene-butadiene to ink adhesion promoter from 1:3 to 3:1, or from 1:2 to 2:1.

5. The primer formulation of claim 1, wherein the ink adhesion promoter comprises one or more of polyethyleneimine, polyvinylpyrrolidone (PVP), polyurethane, or polyacrylamides.

6. The primer formulation of claim 5, wherein the ink adhesion promoter comprises polyethyleneimine.

7. The primer formulation of claim 6, wherein the ink adhesion promoter is a crosslinked polyethyleneimine.

8. The primer formulation of claim 7, wherein the ink adhesion promoter is a crosslinked polyethyleneimine comprising a crosslinker selected from glutaraldehyde, glyoxal, and formaldehyde.

9. The primer formulation of claim 1, wherein the functionalized styrene-butadiene is carboxylated styrene-butadiene.

10. The primer formulation of claim 1, wherein the functionalized styrene-butadiene is amino functionalized styrene-butadiene.

11. The primer formulation of claim 1, wherein the aqueous dispersion includes 5-15% solids.

12. A coated substrate comprising:
a polymer film substrate; and
a primer coating disposed on at least one surface of the polymer film substrate, wherein the primer coating comprises 20 to 80 weight % functionalized styrene-butadiene, and 20 to 80 weight % ink adhesion promoter on a dry weight basis;
wherein the primer coating is substantially free of hydrophilic colloids.

13. The coated substrate of claim 12, further comprising toner, ink, or both printed over the primer composition.

14. The coated substrate of claim 13, further comprising an over print varnish layer disposed over the primer coating and the printed toner, ink, or both.

15. The coated substrate of claim 14, wherein the over print varnish layer comprises UV curable oligomers.

16. The coated substrate of claim 14, wherein the over print varnish layer comprises acrylates.

17. The coated substrate of claim 14, wherein the polymer film substrate comprises polyesters, polyolefins, or combinations thereof.

18. The coated substrate of claim 17, wherein the polymer film substrate is selected from the group consisting of polylactic acid (PLA), polyethylene terephthalate (PET), biaxially oriented polyethylene terephthalate (BOPET), oriented polypropylene (OPP), biaxially oriented polypropylene (BOPP), and biaxially oriented polyamide.

19. The coated substrate of claim 12, wherein the primer coating comprises a ratio by weight of functionalized styrene-butadiene to ink adhesion promoter from 1:3 to 3:1, or from 1:2 to 2:1.

20. The coated substrate of claim 12, wherein the ink adhesion promoter comprises one or more of polyethyleneimine, polyvinylpyrrolidone (PVP), polyurethane, or polyacrylamides.

* * * * *